(12) United States Patent
Trotta

(10) Patent No.: US 11,435,825 B2
(45) Date of Patent: *Sep. 6, 2022

(54) HAPTIC INTERACTION METHOD, TOOL AND SYSTEM

(71) Applicant: Paolo Trotta, Cordenons (IT)

(72) Inventor: Paolo Trotta, Cordenons (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/474,023

(22) PCT Filed: Dec. 21, 2017

(86) PCT No.: PCT/EP2017/084170
§ 371 (c)(1),
(2) Date: Dec. 19, 2019

(87) PCT Pub. No.: WO2018/122107
PCT Pub. Date: Jul. 5, 2018

(65) Prior Publication Data
US 2021/0318755 A1    Oct. 14, 2021

(30) Foreign Application Priority Data
Dec. 26, 2016    (EP) ..................................... 16206902

(51) Int. Cl.
G06F 3/01        (2006.01)
G06T 19/00       (2011.01)

(52) U.S. Cl.
CPC .............. *G06F 3/014* (2013.01); *G06F 3/016* (2013.01); *G06F 3/017* (2013.01); *A63F 2300/8082* (2013.01); *G06T 19/006* (2013.01)

(58) Field of Classification Search
CPC .......... G06F 3/014; G06F 3/016; G06F 3/017; A63F 2300/8082; G06T 19/006
See application file for complete search history.

(56) References Cited

U.S. PATENT DOCUMENTS

| | | | |
|---|---|---|---|
| 2013/0027341 A1* | 1/2013 | Mastandrea | G06F 3/017 345/173 |
| 2013/0162632 A1* | 6/2013 | Varga | G06T 19/20 345/419 |
| 2016/0054797 A1* | 2/2016 | Tokubo | G02B 27/0172 345/633 |

* cited by examiner

*Primary Examiner* — Towfiq Elahi
(74) *Attorney, Agent, or Firm* — Thorpe North & Western

(57) ABSTRACT

The current invention concerns an improved method for communicating and processing motion output signals from agnostic haptic, wearable devices to the host system that runs, manages and modifies a type of an application. Specifically, the application of the inventions specifically is relevant to the domain of gaming, health, simulations, human-machine interfacing, robotics, control of unmanned vehicles/tools and the likes.

14 Claims, 1 Drawing Sheet

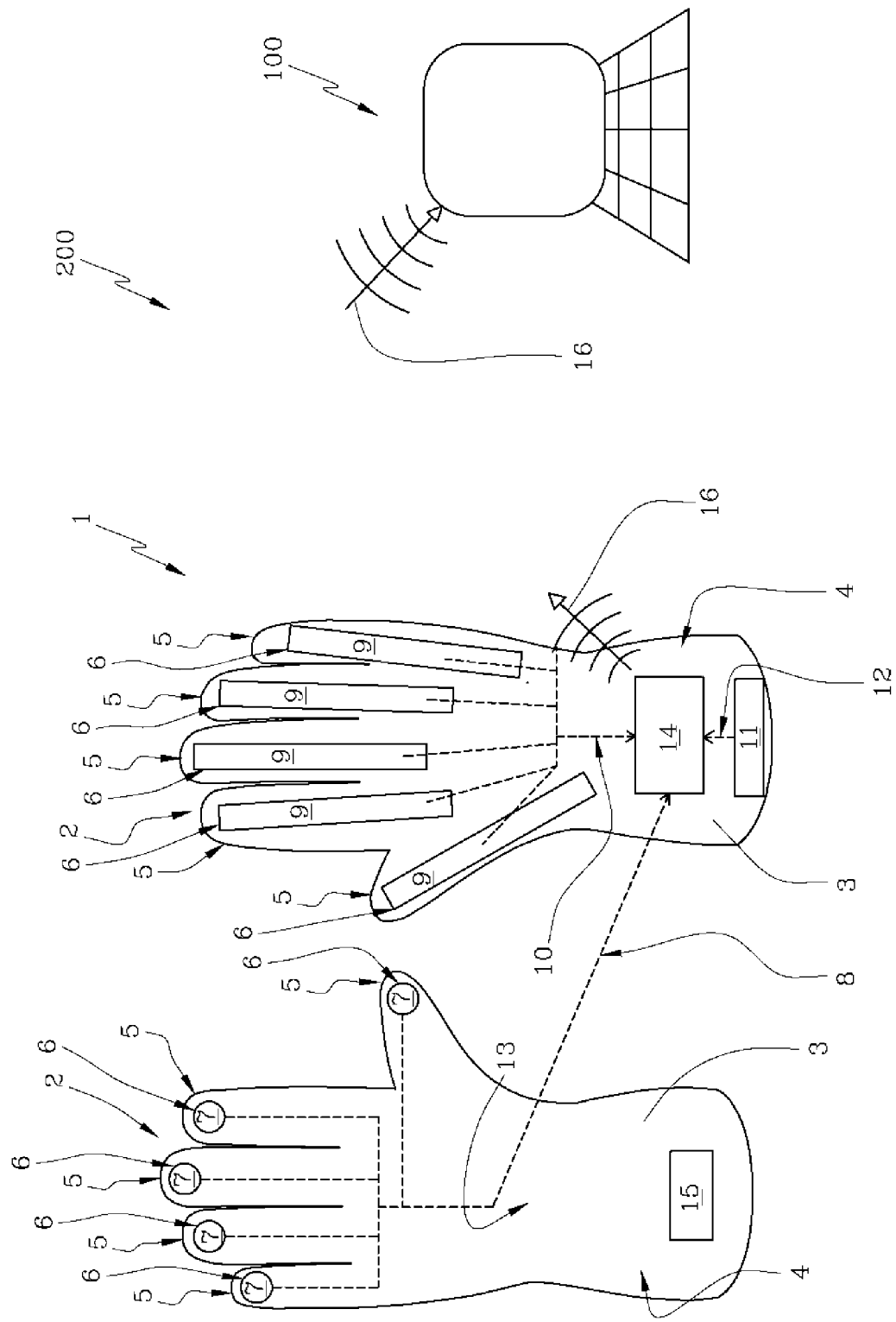

HAPTIC INTERACTION METHOD, TOOL AND SYSTEM

TECHNICAL FIELD

The invention pertains to the technical field of interaction of haptic tools with applications being run on a host system via an improved method for communicating and processing motion output signals from agnostic haptic, wearable devices to the host system that runs, manages and modifies said application, preferably virtual realities and augmented realities. Specifically, the application of the inventions specifically is relevant to the domain of gaming, health, simulations, human-machine interfacing, robotics, control of unmanned vehicles/tools and the likes.

BACKGROUND

The objective of the invention is providing an improved and more immersive method of interaction of a user with an application, preferably with a virtual or augmented reality, via an improved handling device and an improved method of processing the signals registered by the handling device, to intuitively convey the actions from a user into a desired effect in the application (potentially capable of creating a VR or AR), without excessive demands for setting up the handling device with respect to the host system, as is the case in many currently known embodiments.

Known methods and specifically haptic handling devices for interaction with electronic applications, specifically virtual (and augmented) reality, have been developed specifically to suit the needs of a specific host system (for instance computer, smartphone, PlayStation, Xbox and others) or particular types of applications (shooter, flight sim, sports and others), and lack the versatility to be used for different occasions, often even lacking the basic ability allowing the use in other situations (often developers won't allow a joystick for a first gaming system to be usable with a second different gaming system) and in fact prevents the interoperability of such tools. Not only does it quickly become a very costly endeavor for a user to be equipped for a wide variety of applications and/or systems, it also becomes more difficult, as the particular of each of the devices (joysticks, steering wheels, guns, etc.) will be intrinsically different in use, and won't allow a user to easily become familiar with a wider range of applications.

A more generic range of such tools has also been manufactured, however these typically require a separate, specific program (plug-in, SDK or others) to be installed in the host system that needs a specific update, requires reprogramming or adaptations for each separate application type that is to be run on the host system.

Both categories of handling devices allow objects to be moved, visualizations to be adapted, or the actuation of other parts of (VR or AR) environments by detecting motion of the user via sensors which send signals to a host system (computer, Xbox, PlayStation, etc.).

Furthermore, it is to be considered that the relevance of most prior art handling devices with respect to the concept of this invention, is nonexistent, as prior art handling devices typically take a specific shape relevant to their application (as said, steering wheel, rifle, . . . ) and as such is only usable in a limited number of applications, many of these even departing from the physical realities of the tools in fact. For instance, a rifle tool for gaming will typically serve both as pistol, rifle, bazooka, etc. even without having the correct shape. Even further, a joystick will typically be employed as a myriad of other tools, ranging from weapons to steering wheels, to even a hand and fingers. All of these handling devices will require a specific piece of programming as mentioned in order to communicate efficiently with the host system the application is running on to achieve the desired actions in the application, and specifically in a virtual or augmented reality. The intent of this invention is to let the handling device actuate on the user's hand in order to properly convey the experience of handling the correct tool applicable to each situation in an application, something which cannot be guaranteed with many of the currently available tools.

A user cannot be expected to purchase an entire arsenal of application-specific handling devices (steering wheels, steering joysticks, pistol(s), rifle(s), other weapons, flight joysticks—often again specific to certain vehicles), but it is still desirable to obtain an optimally realistic experience in the interaction with the application, for instance a virtual or augmented reality. This is optimally achieved by the invention proposed in this document, wherein it is chosen not to provide an improved tool with sensors and electronics to be handled which conveys the actuations exerted on said improved tool, but instead aims to provide a handling device which conveys the actuations being exerted on a 'dead' object by the handling device, typically said handling device being shaped to fit around a body part of the user, generally one or more hands (and/or fingers) and/or arms of the user. This furthermore achieves to simplify the way a user can, with only few and easy actions, can provide control signals to a host system with very high accuracy, this as opposed to less optimal handling devices (for instance a joystick for a shooter application) that will require numerous and/or complex manipulations in order to provide the desired signal to the host system.

A last important drawback of many of the known 'interaction tools' to be used along an electronic processing system such as PlayStation etc., is that these frequently require additional infrastructure, such as cameras, sensors, wiring to accurately track the movements of the user. Not only is this a costly investments, it restricts the applicability and mobility of the interaction tools (needs enough free space, requires the relocation and possible installation of these infrastructural elements when using the interaction tools in a new location, and generally makes the processing of the data more difficult as more parameters are to be included in calculations).

There remains a need in the art for an improved handling device shaped to fit a body part of the user capable of detection actions and manipulations of the user's body part, specifically the hand and fingers in most cases, and of transmitting these manipulations and actions as signals to the host system running the (VR or AR) application, which host system is adapted to automatically translate the signals from the handling device of the invention into signals typical for the type of host system and the type of (VR or AR) application being run. In general, the invention aims to provide a simplified method of interaction between a handling device and a host system for running, managing and modifying (VR or AR) application environments.

The applicant takes note that some improvements were made in this field, for instance discussed in such documents as US 2016/054797 A1, US 2016/279514 A1 and US 2016/162022 A1, though the solutions offered therein are found lacking. The invention disclosed in the present application intends to further improve on the mentioned documents, as well as anything else existing in the field.

The present invention aims to resolve at least some of the problems mentioned above.

SUMMARY OF THE INVENTION

The present invention provides an improved method for agnostic interaction with a host system running a type of application (preferably agnostic interaction with a virtual reality (VR) or augmented reality (AR) produced by a host system, whereby said host system is suitable for running a type of VR and/or AR application), comprising the following steps:

a. detecting one or more hand manipulations of a user via one or more haptic devices, preferably one or more haptic gloves, and providing one or more motion output signals, associated to the hand manipulations, to a processing unit on the one or more haptic devices;

b. providing a system conversion library to said host system, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, two or more specific home video game consoles, smartphone, robots, drones, smart tvs, smart glasses and similar;

c. processing the provided motion output signals in the processing unit on the one or more haptic devices;

d. transmitting the processed motion output signals to the host system, preferably via a wireless communication standard, more preferably via Bluetooth;

e. translating said motion output signals by the host system into one or more associated control signals according to the system translation profile distinctive to the host system running the application; and f. processing said associated control signals in the application and modifying features therein according to at least said control signals, by the host system. Preferably, the application is a VR and/or AR application, and the step comprises modifying features of the virtual reality or the augmented reality according to the control signals.

In an alternative embodiment (again, preferably with the method providing agnostic interaction with a virtual reality (VR) or augmented reality (AR) produced by a host system, whereby said host system is suitable for running a type of VR and/or AR application, and whereby the step f. of processing the control signals preferably comprises modifying features of the virtual reality or the augmented reality according to the control signals), the method comprises the following steps:

a. detecting one or more hand manipulations of a user via one or more haptic devices, preferably one or more haptic gloves, and providing one or more motion output signals, associated to the hand manipulations, to a processing unit on the one or more haptic devices;

b. providing a system conversion library to said processing unit, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, two or more specific home video game consoles, smartphone, robots, drones, smart tvs, smart glasses and similar;

c. processing the provided motion output signals in the processing unit on the one or more haptic devices;

d. translating said motion output signals by the processing unit into one or more associated control signals according to the system translation profile distinctive to the host system running the application;

e. transmitting the one or more associated control signals to the host system, preferably via a wireless communication standard, more preferably via Bluetooth; and f. processing said associated control signals in the application and modifying features therein according to at least said control signals, by the host system With the term "haptic device" as used herein, the document refers to a wearable item, preferably suitable for being worn on the hand and/or fingers of a user such as a glove, provided with a number of sensors to detect a wide array of hand manipulations, as will be further discussed. Note the importance that the haptic device is not a handling device as perceived in prior art documents, wherein the handling device is a tool to be handled by a user (typically manually), but instead acts as the user (or a body part thereof, typically a hand).

With the term "host system" as used herein, the document refers to a myriad of possible devices capable of running applications (programs, games, etc.), and preferably capable of producing a VR or AR environment and of visualizing said environment (possibly via one or more display devices of some kind that can be built in the host system or can be plugged in—wirelessly and/or wired). This host system can be a general computer, laptop, tablet, smartphone, gaming console (PlayStation, Xbox, Wii, and others), smart-tv, etc or dedicated AR and/or VR systems. These can for instance be supplemented by VR/AR headsets or glasses. Note that a smartphone can be a host system, while the application that is run can for instance be receiving a telephone call and managing said telephone call, amongst other things such as running the visual display menu of the smartphone.

With the term "hand manipulations" as used herein, the document refers to a number of absolute and/or relative movements or actions by the hand and/or parts thereof.

The term "type of application" as used herein, is meant a general area or field to which the application belongs. Typically, for gaming this can be, as previously mentioned, the type of game such as shooters, RPG, sports (with several subtypes for different sports), racing (again with several possible subtypes), flying, etc. Note that many so-called types of 'simulator applications' will also belong to the category of gaming. It is to be noted that in the convention handling devices, where the handling device is the tool to be handled, the handling device is very different depending on the application type, while the invention solves this problem expertly by in fact acting as the hand (or a shadow version thereof) of the user (or another body part depending on the particular embodiment of the handling device of the invention).

The term "glove" or "haptic glove" can furthermore refer to an exoskeleton for a hand. The same applies to haptic devices of the invention for other body part(s), these can similarly be provided as a type of exoskeleton for said body part(s).

In a second aspect, the present invention provides an electronic system-implemented method for preprocessing motion output signals in a host system suitable for running a (virtual reality (VR) and/or augmented reality (AR)) application, and suitable for creating an interactive (virtual reality (VR) and/or augmented reality (AR)) environment, received from one or more haptic devices by the host system, preferably one or more haptic devices as described in document, comprising the step of translating said received motion output signals by the host system into one or more associated control signals according to a predetermined system translation profile from a system conversion library, said system conversion library comprising a plurality of system translation profiles, each distinctive to a specific type of host system, said predetermined system translation profile being distinctive to the type of the host system running said application and preferably also to the type of application being run on the host system running said application.

In a further aspect, the present invention provides an electronic system for creating, managing and interacting with a (virtual reality (VR) and/or augmented reality (AR)) application environment, comprising:
  a. an electronic host system configured for producing the (VR and/or AR) environment, said host system being suitable for running a type of (VR and/or AR) application, and for modifying the produced (VR and/or AR) environment according to received control signals;
  b. at least one at least partly flexible haptic devices suitable to be worn on a user's hand, comprising:
    a. a plurality of sensors configured for detecting hand manipulations of the user's hand and transmitting associated motion output signals, at least comprising: bending of one or more fingers and pressure being exerted by one or more surface on a surface;
    b. a processing unit electronically connected to the plurality of sensors, said processing unit being adapted for receiving the associated motion output signals from one or more of the plurality of sensors, configured for processing the associated motion output signals, and adapted for transmitting the processed motion output signals to the host system via a wireless communication standard, preferably via Bluetooth;
whereby said host system is provided with program instructions to execute the electronic system-implemented method as described in this document.

In a further aspect, the invention provides an electronic system for interacting an electronic host system running a type of application, and for modifying the application according to received control signals, said electronic system for interacting comprising at least one at least partly flexible haptic devices suitable to be worn on a user's hand, comprising:
  i. a plurality of sensors configured for detecting hand manipulations of the user's hand and transmitting associated motion output signals, at least comprising: bending of one or more fingers and pressure being exerted by one or more surface on a surface;
  ii. a processing unit electronically connected to the plurality of sensors, said processing unit being adapted for receiving the associated motion output signals from one or more of the plurality of sensors, configured for processing the associated motion output signals, said processing unit being configured to recognize the type of host system, and adapted for transmitting the processed motion output signals to the host system via a wireless communication standard, preferably via Bluetooth;

whereby said processing unit is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, home video game console, smartphone, dedicated VR and/or AR hardware, robots, drones, smart tvs, smart glasses and similar. Said system conversion library is typically stored in a memory element of the processing unit, or on the haptic device and accessible by said processing unit.

Preferably, the preceding method specifically provides an electronic system for interacting with a virtual reality (VR) and/or augmented reality (AR) produced by an electronic host system, said host system being suitable for running a type of VR and/or AR application, and for modifying the produced VR and/or AR according to received control signals.

Alternatively, the invention provides an electronic system for running, managing and interacting with a type of application, preferably an application producing a virtual reality (VR) and/or augmented reality (AR), comprising:
  a. an electronic host system configured for running the application, and for modifying the application according to received control signals;
  b. at least one at least partly flexible haptic devices suitable to be worn on a user's hand, comprising;
    a. a plurality of sensors configured for detecting hand manipulations of the user's hand and transmitting associated motion output signals, at least comprising: bending of one or more fingers and pressure being exerted by one or more surface on a surface;
    b. a processing unit electronically connected to the plurality of sensors, said processing unit being adapted for receiving the associated motion output signals from one or more of the plurality of sensors, configured for processing the associated motion output signals, and adapted for transmitting the processed motion output signals to the host system via a wireless communication standard, preferably via Bluetooth;
whereby said host system is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, home video game console, smartphone, dedicated VR and/or AR hardware, robots, drones, smart tvs, smart glasses and similar. Additionally, said system conversion library can be supplemented for both aspects with an application conversion library, or combined therewith.

Preferably, the electronic host system is configured for producing the VR and/or AR, said host system being suitable for running a type of VR and/or AR application, and for modifying the produced VR and/or AR according to received control signals.

DESCRIPTION OF FIGURES

FIG. 1 shows a schematic representation of a haptic device according to the invention and an electronic system for running a type of interactive application, and optionally creating and managing VR or AR environments.

DETAILED DESCRIPTION OF THE INVENTION

The present invention concerns an improved method and haptic device for agnostic interaction with a host system running a type of (interactive) application, preferably a VR and/or AR application.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "application" generally refers to a program capable of being run on an electronic system. Typically, an application creates an environment in which the user can perform a number of tasks and/or issue a number of commands.

The term "agnostic interaction" refers to the interaction between host system and haptic device being generally independent of host system, thus not requiring additional plug-ins or other software to be downloaded in order to be able to communicate properly. The latter is the case in most computer systems when being coupled with a not brand-specific (complex) electronical device such as a haptic glove, which is one of the problems the invention wishes to address.

The term "nano-compressor" refers to a small-scale compressor suitable for inflating/deflating air chambers with gas (air). The small scale allow that a plurality can be mounted on a haptic glove without causing significant discomfort to a user, nor influence the actions of the user.

The recitation of numerical ranges by endpoints includes all numbers and fractions subsumed within that range, as well as the recited endpoints.

In a first aspect, the invention provides an improved method for agnostic interaction with a host system running a type of application, preferably an improved method for agnostic interaction with a virtual reality (VR) or augmented reality (AR) produced by a host system, said host system suitable for running a type of VR and/or AR application, as described previously in both the first as in the alternative embodiment.

As mentioned earlier, prior art devices are often system-specific and deny the user interoperability with other systems, or require separate, specific software for each handling device to run on each system. The applicant has overcome this by providing a more generic handling device that in the first place is meant to detect hand manipulations, instead of handling device manipulations. This will allow for a far more realistic representation of the action the user intends to convey in the (VR or AR) application, and can furthermore be far more intricate and detailed than actions possible on a typical joystick (or even keyboard) or the likes. These more traditional controllers only have a limited amount of variety in the way it can be manipulated, and thus a far more limited amount of possible signals/actions that can be transmitted (so in order to allow more actions by a user in the (VR or AR) application environment, combinations of signals will become necessary, making the interaction more complex and less natural). Furthermore, it allows the user to handle the real or lifelike (tangible) objects (for instance golf club, rifle, . . . ) to give a better indication of their actual weight, dimensions, and feel, to give a more realistic experience.

By using a wearable haptic device, in order to better capture the true, desired movements and manoeuvers of the user, this allows for a wider range of motion output signals which can lead to issues in 'translating' these to the host system in order to create the desired effect in the (VR or AR) application environment. In the few existing prior art systems similar to the haptic device of the invention, this is usually remedied by limiting the application versatility of such wearable haptic devices (in fact, creating them for a single purpose only), whereas the object of this invention does not intend to be limited in its use in certain applications, but instead offers a universal applicability of the wearable haptic device. Prior art devices such as a controller (Wii or similar) have only a limited range of motions and nuances it can detect, although depending on the particular application that is run, there exists a wide range of possible motions and nuances that need to be detected. For instance, a golf game will have the user hold and manipulate a controller in a very particular way, while a helicopter sim will have the user manipulate the controller in an entirely different fashion and will need to detect very different actions. By following and detecting the exact motions, pressures, etc. of the user, the invention at hand is able to correctly capture these nuances.

This is furthermore achieved by the method in a possible embodiment working with an application conversion library comprising a number of predefined, application-specific 'translation profiles', or application translation profiles, which are meant to process the motion output signals registered by the haptic device, into the control signals the host system is expecting to receive, or in other words, allows the haptic device to emulate the devices natively supported by the host system by translating the motion output signals of the haptic device accordingly.

The most commonly used application types are limited (shooter, flight sim, racing, medical intervention, sports, etc.), although having a multitude of variants in all these categories (type of guns/rifle, type of plane/chopper/ . . . , type of car/ . . . , and so on). As noted, by choosing to providing a haptic device shaped like the body part (hand typically), there is no longer a problem with these different variants, as they will provide the same or similar signals to the host system. The difference in types of applications is then solved by providing a number of predefined translation profiles adapted to specific applications to ensure that the correct control signals are provided to the host system to be used in the (VR or AR) application. Note that in case of very specific application types which were not provided, a translation profile can be set up by the user easily, and saved for future use. This profile can be saved locally on the haptic device and/or on the host system.

The same applies to possible host systems, and the applicant has handily made us of this by providing translation profiles for these host systems. In practice a number of popular home video game consoles are in existence but are not compatible with each other, especially with each other's controllers. The applicant conveniently solves this by providing a system conversion library with a number of specific translation profiles for different host systems, system translation profiles. Most conveniently, these can be set up for most known consoles, and additionally other (gaming) processing systems (smartphones, computers, laptop, dedicated AR or VR systems, etc.). Again, specific system translation profiles for 'unknown' host systems can be set up by the user and saved on the haptic device and/or on the host system itself.

The applicant in a first embodiment of the method according to the invention, provides a system conversion library on the host system (preferably as a downloadable executable, for instance can be downloaded directly from the haptic device) that comprises a multitude of predefined system translation profiles, designed to correctly 'translate' or convert motion output signals from the haptic device into control signals usually received by the host system to define the desired action. Typically, there exist a number of popular and widespread gaming consoles, as well as other host systems (smartphone, specially dedicated VR/AR processors, pc, laptop, . . . ), and for these systems, a predefined system translation profile can be set up, while for more uncommon systems, this can be defined by a user. Upon recognition of the host system, the correct system translation profile is selected and used in the conversion. Alternatively, in a second embodiment, the system conversion library is provided to the haptic device which executes the translation according to the principle discussed above.

The transmitting of processed motion output signals from the (processing unit of the) haptic devices to the host system runs through wireless communication, although wired communication is possible as well. Preferably, the signals are communicated via Bluetooth (Bluetooth Low Energy—BLE), however, Wi-Fi or other wireless communication standards can be used (alternative to or in addition to Bluetooth), such as ZigBee, etc., as this allows for a fast, reliable connection without having to deal with cumbersome wires during the interaction, which can hinder the immersive experience. Such a communication can be achieved by a transceiver microchip (or a component with similar function) implemented in the processing unit.

In this document, the shape of the haptic device is generally referred to as (one or more of) a wearable glove, however, it should in no way be seen as limited to that. It could for instance also take the shape of a head mask, a head gear, glasses, footgear, body gear and combinations thereof. For instance, a combination of a wearable glove with further arm gear (for instance worn on the biceps, or even in the elbow) could be of interest to specifically position to detect the relative position of the hand to the arm, the angle with which the arm is bent, how it is generally aimed, etc. Furthermore, it is to be noted that the haptic device may generally be referred to as a glove, but that this in no way requires the device to be entirely shaped as a standard glove.

It can also be generally shaped to resemble and/or fit a hand-like structure, for instance flexible surface in contact with the hand and connected thereto (by a ring for example). However, most preferably, the handling device is configured to follow the motions of the user's hand. Consequently, the handling device is made, entirely or partially, of flexible material. In addition, the handling device comprises its own base portion which comes into contact with the palm of the hand, and a plurality of peripheral portions, intended to come into contact with the fingers of the hand.

It should be considered that the haptic device may possibly be provided with multiple (spatially separated and/or detachable) subordinate devices or slaves which all connect to the first, 'central' haptic device. These subordinate devices can comprise one or more sensors (as discussed) and transmit the motion output signals detected by the sensors on the subordinate devices to the central haptic device. These subordinate devices may for instance be a second glove, finger pads, goggles, a helmet, a microphone, or other pieces of clothing or gear that the user may wear. The configuration of the subordinate devices and the central haptic device correspond to a cascading sensor system in which there is no direct communication to the host system via the subordinate devices.

In a further improvement, parts of the haptic device can be adapted to allow interaction with capacitive screens, for instance to allow operation of a smartphone, tablet, etc. If the haptic device is shaped like a glove, such capacitive-enabling portions will typically be on the tips of one or more fingers.

Generally speaking, the haptic wearable device will comprise a supporting structure, preferably flexible, to allow the device to be worn practically on a body part. In this document, most concern will be directed towards a haptic device to be worn on a hand, but the reasoning applies to any body part and the concept of the invention should not be limited unduly to a hand only. The supporting structure, a glove, is provided with a plurality of sensors. Said sensors can comprise a number of bending sensors along to detect bending of a body part of the user. In this case, these bending sensors will extend longitudinally and run along at least part of the fingers of a user to detect the bending thereof. More generally speaking, the bending sensors will extend along peripheral portions of the haptic device, extending away from a central portion thereof. Nonetheless, bending sensors may as well be present in the central portion of the haptic device.

Furthermore, a number of pressure sensors can be provided to detect the pressure on a portion of the haptic device against a surface. Typically these pressure sensors will at least be provided on peripheral ends of the haptic device (finger tips), and preferably additionally on a number of other (intermediate) positions. For instance, an interesting point to provide these is on the transitioning point from the metacarpals to the phalanges on the palm side of the hand.

A third kind of sensors are so-called haptic sensors, which typically extend longitudinally along peripheral portions of the haptic device, extending away from a central portion thereof, although the sensors may preferably be present in the central portion of the haptic device as well. These haptic sensors are designed to impart a feeling of resistance, and optionally pressure (to indicate a user is touching something). Typically, these sensors comprise inflatable elements to make a user experience more or less resistance. Note that these sensors are typically placed on the side of the supporting structure that is expected to come into contact with an object or surface that is not the user itself, while bending sensors are usually placed on the opposite side.

Additionally, other types of sensors may be present, for instance a gyroscope to determine the position and orientation of the haptic device with respect to a stationary reference. The gyroscope may to that purpose be an "attitude and heading reference system" (AHRS), typically comprising sensors on three axes to provide attitude information on the device (amongst which roll, pitch and yaw). The sensors on the axes can comprise gyroscopes, accelerometers and magnetometers. Alternatively, an inertial measurement unit (IMU) can be employed as well, from which the data is then processed in a different component or device. A barometer may furthermore be included.

Temperature sensors may be included in the haptic device as well, adapted to register temperature variations, in order to modify the measurements by one or more of the other sensors (for instance from a magnetometer).

Also, so-called dead reckoning sensors may be present.

The haptic device may comprise temperature feedback actuators, which can vary their temperature depending on the feedback signals that are sent to the haptic device, and which actuators can convey the temperature to the user. This is particularly useful for realistic simulation applications (survival simulators, combat simulators, flight simulators, etc.) where temperature is a very real parameter that can influence the behavior and performance of a user tremendously. Preferably, the temperature feedback actuators can be set to a certain minimal and maximal temperatures for protection, and can be set up to change temperature to a lesser degree (for instance with respect to a base temperature, for each degree the simulation temperature is increased or reduced, the feedback temperature is increased or reduced for a fraction of the increase, preferably up to a certain temperature limit both upwards and downwards). It is to be noted that these actuators may also be used to impart the feeling of pain/induce pain on the user (again, with proper safety precautions) by exposure to high or low temperatures.

The haptic device may comprise vibration feedback actuators, which can produce vibrations. The vibration feedback actuators are close to the surfaces of the haptic device that touch the user when wearing or wielding the haptic device in order for the user to feel the vibrations.

The haptic device may comprise touch sensation feedback actuators that are capable of inducing surface touch feeling on the user wearing the device. A possibility for the implementation can be through (functional) electric stimulation of the fingertip receptors (or receptors on other parts of the body of course) of the user in order to emulate the actual electrical signal sent to the peripheral nervous system when a surface of a material is perceived (smooth, rough, jagged, soft, hard, gelatinous, etc.). The electrical stimulation can for instance induce low level muscle spasms, which creates a tangible/tactile sensation. Note that the surface does not necessarily need to be solid, but as said can be gelatinous, elastic, etc., resulting in a varying resistance that would normally felt by a user. This varying resistance can be properly emulated by modulating the intensity of the electrical stimulation as the user's hand/finger (or other body part) moves. Depending on the type of feedback that is desired, the electrical stimulation can vary in intensity and duration. The electrical stimulation may be functional electrical stimulation (FES), transcutaneous electrical nerve stimulation (TENS) and/or neuromuscular electrical stimulation (NMES). In a possible addition, temperature feedback actuators may also be present which use electric signals to impart the feeling of heat, cold, and generally temperature changes, to the user. This further strengthens the authentic feeling of the surface contact to the user.

The haptic device may comprise pain feedback actuators that are capable of inducing pain on the user wearing the device. A possibility for the implementation can be through electric stimulation of the pain receptors of the user (electroshock), or through heat. These possibilities allow the application to impart a more realistic feeling in certain applications (for instance in combat simulation).

It is to be noted that not all types of sensors are necessarily present on the haptic device of the invention. It is possible to only have bending sensors, or only pressure sensors or only haptic sensors, or the combination of pressure and bending sensors, or pressure and haptic sensors, or bending and haptic sensors, or all three, possible supplemented with one or more of the other options discussed.

As mentioned before, the haptic device comprises a processing unit, with a CPU or CPU capability. Said processing unit is operably connected to the mentioned plurality of sensors in order to obtain the measurements and motion output signals from the sensors. Preferably, this connection is wired (electrical wiring), although a wireless connection could be possible, especially should there be made use of a number of haptic devices, which are in communication with a single central processing unit. The processing unit is configured to process the obtain motion output signals from the sensors as is necessary (can be dependent on the host system requirements), and preferably applies an error estimation and correction to this data from the sensors. Further processing is also possible, for instance, compression and/or encryption before forwarding the data to the host system, where it is provided to a specific program or piece of software that is configured to process the received motion output signals further into the control signals native to the host system. Once this translation step is completed, the control signals are provided to the host system to be processed in the (VR or AR) application that is running, thereby typically modifying features of the produced (VR or AR) environment, or changing it in some way or another. Optionally, feedback signals can then be provided back to the haptic device, and thereby, to the user.

As mentioned before, different host systems may have different 'expected' control signals to convey one or more particular actions to the host system. Therefore, the applicant applies in its proposed method a system translation profile from a system conversion library, which translation profile is specific to the type of host system on which the (VR or AR) application is run. A wide variety of profiles for 'standard' systems can be pre-programmed, thus easily allowing a plug-and-play operability of the method proposed by the applicant, whereby the correct translation profile is chosen for the host system. In other words, if the haptic device is 'loaded' (recognized by the host system, accepted by a user) by a host system, the specific program of the method will recognize the type of host system, for instance a PlayStation, and will convert the received motion output signals from the haptic device's processing unit into the correct control signals a PlayStation host system would expect.

It is to be understood furthermore that the processing unit adapts the motion output to a suitable (interface) standard for communication with the host system. This may be Bluetooth, Zigbee, WiFi, wired (USB) or other standards.

In a possible embodiment, the processing unit further comprises one or more memory element which (temporarily) store recent motion output signals (or the associated control signals if the motion output signals have been processed) in case there is no connection to the host system. Once a connection has been established later on, the stored signals can then be communicated to the host system, which can then translate the received signals into actions or movements. For instance, the haptic device may store movement information (acceleration, tilt, etc.) temporarily. Once the connection is (re)established, the host system can then recreate the path/movement that was acted out while no connection was present. This recreation can be accomplished by using dead reckoning processes. The memory element stores information on relative discrete movements (over discrete portions of time), which can then be used to reconstruct the entire movement by combining them.

In an improvement to the first embodiment of the method according to the first aspect of the invention, the method furthermore comprises a step of providing an application conversion library to said host system, said application conversion library comprising a plurality of application translation profiles, each application translation profile distinctive to a specific type of application, and each application translation profile being adapted for mapping a conversion of received motion output signals from the one or more haptic devices to one or more associated control signals suitable for said specific type of application, preferably whereby said application conversion library comprises application translation profiles distinctive to at least two or more of the following types of application: shooter application, flight simulator application, driving or racing application, remote piloting application, smart device interaction; whereby the step of translating said motion output signals into one or more associated control signals according to the system translation profile distinctive to the host system running the application, is executed furthermore according to the application translation profile distinctive to the type of the application being run on the host system.

In an improvement to the second (alternative) embodiment of the method according to the first aspect of the invention, the method furthermore the step of providing an application conversion library to said processing unit, said application conversion library comprising a plurality of application translation profiles, each application translation profile distinctive to a specific type of application, and each application translation profile being configured for mapping a conversion of received motion output signals from the one or more haptic devices to one or more associated control signals suitable for said specific type of application, preferably whereby said application conversion library comprises application translation profiles distinctive to at least two or more of the following types of application: shooter application, flight simulator application, driving or racing application, remote piloting application, smart device interaction; whereby the step of translating said motion output signals into one or more associated control signals according to the system translation profile distinctive to the host system running the application, is executed furthermore according to the application translation profile distinctive to the type of the application being run on the host system.

In a furthermore preferred embodiment, the method comprises the step of the user manually determining the application translation profile, from the application conversion library, to be used for translating the motion output signals, furthermore allowing the user to create a new application translation profile for the type of application running on the host system, whereby said new application translation profile is preferably stored on the processing unit of the haptic device and/or on the host system.

In a preferred embodiment of the first aspect, the method comprises a step of automatically determining the type of the host system by the processing unit. By automatically determining the type of the host system (for instance from a range of common and/or more specific types of host systems such as PlayStation, Wii, Xbox, PC, smartphone—again possibly with different subtypes—, smart-tv's, etc.), the method provides an enhanced plug-and-play ability to the user, and more generally the haptic device the user is employing. Thus it is no longer required that the user performs an elaborate set-up, or has to select the 'correct' host system (more important even as not all types will be as obvious as the ones listed above, especially when dealing with highly specialized host systems, for instance in medical applications, professional flight sims, etc.). Where more and more manufacturers in smartphone, game console and similar electronic media industries, have started developing single-system controllers, joysticks, haptic devices, etc., this has the dual effect of excluding users from certain systems/applications due to the exorbitant cost of these devices, but secondly also requires the user to develop a 'feel' and adequacy for each new device separately, instead of becoming extremely proficient with a single tool, as is the intention of the invention at hand.

In a preferred embodiment of the first aspect, the method comprises a step of automatically determining the type of the host system by the processing unit, and in case of inability to determine the type of the host system, allowing the user to either manually determine the type of the host system and/or prompting the user to create a new system translation profile for the undetermined host system, whereby said new system translation profile is preferably stored on the processing unit of the haptic device and/or on the host system. Alternatively or additionally, the new system conversion library is stored locally on the host system. Similarly, a new application translation profile for the application conversion library can be set up by the user for unknown types of applications.

Again, by automatically determining the type of the host system (for instance from a range of common and/or more specific types of host systems such as PlayStation, Wii, Xbox, PC, smartphone—again possibly with different subtypes—, smart-tv's, etc.), the method provides an enhanced plug-and-play ability to the user, and more generally the haptic device the user is employing. Thus it is no longer required that the user performs an elaborate set-up, or has to select the 'correct' host system (more important even as not all types will be as obvious as the ones listed above, especially when dealing with more specialized host systems, for instance in medical applications, more professional flight sims, etc.).

The step of automatically determining the type of host system may be implemented through a number of methods, of which a few are elaborated on in what follows:

A first method comprises a so-called 'handshake' operation in the communication protocol between the host system and the processing unit. The processing unit will request an identification of the host system (a system code of any type to identify the host system), which the processing unit then compares to known identifications in its memory. This identification can for instance be obtained by the processing unit consulting the library of the host system (any host system in the field comprises such a library) and by analyzing (some of) the data in the library, the type of host system may then be determined. It is to be noted that such a procedure would mean that no actions or modifications whatsoever are required to integrate any existing host system in the method of the invention. Alternatively, the host system may be modified to automatically provide an identification upon request of the processing unit however. Typically, the processing unit will have a list of identifications for most of the commonly used systems. Given that there are a limited number of 'players' on the market (for consoles, such a list could for instance comprise Sony, Microsoft, Nintendo, as well as some smaller players, which list can then be further subdivided for specific host systems of the players; for PC and laptops, smartphones and tablets, and other types of host systems, similar lists may be readily made; of course new manufacturers that enter the field and new technologies can easily be added to this list) this list will not be overly large, allowing an easy identification. It is to be noted that such a list can easily be updated should new systems or even new providers enter the market, for instance via a patch that is automatically or manually downloaded onto the processing unit when it is connected to the internet.

A second method is the integration of software and/or hardware into the host system, which could communicate directly with the processing unit. Said piece of software and/or hardware is specifically adapted to the host system, and can thus share the specifics with the processing unit, allowing an easy identification of the host system.

A third method would be by "trial and error". The processing units begins a synchronization process in which 'random' command signals are communicated to the host system. Preferably, the command signals that are communicated are known to elicit a response from host systems of one or more of the 'known' types. Based on the responses, the type of the host system is then determined. This could be determined after a single exchange, or after a few iterations, depending on how fast the host system type is determined. Preferably, the command signals are sent in an order that matches the prevalence of host systems, as this would statistically minimize the recognition time for determining the type. Alternatively, the command signals are sent in an order that matches the last recognized host systems. Building further on this approach, the command signals can be sent in an order based on the frequency with which each type of host system has been recognized for the specific processing unit, or even a mix of two or more of these approaches (for example, based on frequency of use and on last used host system). It is to be noted that after the determination of the type of host system, a confirmation signal can still be sent to the host system to make sure that the determination was correct.

In a preferred embodiment, the haptic device thus is a haptic glove suitable for being worn on a hand of the user, comprising sensors at least adapted for detecting the following hand manipulations, and preferably the intensity and/or speed and/or acceleration of said following hand manipulations: bending one or more fingers of the hand, relatively displacing and/or rotating one or more fingers of the hand with respect to one or more other fingers of the hand, pressure being exerted by a portion of one or more fingers on a surface, pressure being exerted by a portion of the hand on a surface, displacement of the hand with respect to the host system, rotation of the hand with respect to the host system; and wherein said following hand manipulations, and preferably said intensity and/or speed, is provided to the processing unit as associated motion output signals. A list of possible sensors suitable for detecting said movements has previously been discussed.

Note that when referring to a body part such as 'hand' or 'finger', it is to be understood the device in fact detects the manipulation exerted on the part of the device pertaining to said body part.

In a preferred embodiment, the processing unit is, or is comprised in, a smartphone or electronic device, preferably suitable for operable insertion in a virtual reality headset. More preferably, said smartphone or electronic device comprising one or more sensors for determining spatial displacement of the user: gyroscope, dead reckoning sensor, magnetometer and/or accelerometer; said method comprising the steps of: processing displacement signals from said one or more sensors for determining spatial displacement; providing additional and/or alternative signals to the host system based on said displacement signals to the host system; and furthermore modifying features of the application (environment), preferably by modifying a virtual reality or an augmented reality by the host system according to at least additional and/or alternative displacement signals.

Given the omnipresence of smartphones in today's world, the proposed method can specifically be adapted thereto. Additionally, the method can make use of a number of sensors already present in the smartphone itself, and thus not only rely on the sensors of the haptic device. This can for instance be used as a correction on certain signals from the haptic device, or can convey additional data (for instance, orientation of the head of the user—direction of line of sight of the user—when used with a headset). However, the sensors of the smartphone can especially be used with respect to detecting spatial displacement of the user.

In a preferred embodiment, the haptic glove is adapted for determining the intensity of said following hand manipulations, comprising a step of calibrating at least the motion output signals associated to the intensity of the bending of one or more fingers of the hand and to the intensity of pressure being exerted by a portion of one or more fingers of the hand. By having the user calibrate the intensity settings for the measurements of the haptic device, he can further personalize the haptic device to his own needs, or those of the particular application, for instance by setting activation thresholds. This option of calibration can be prompted at set-up for instance as a yes-or-no question. If chosen, the user can then give certain intensities of bending, pushing, pulling and/or more actions more specific meanings to be used in the application.

In a preferred embodiment, said one or more haptic devices comprise a plurality of reversibly inflatable air chambers on the haptic device for exerting pressure and/or force on a body part of the user, and a plurality of nano-compressors for inflating and deflating said air chambers, said method comprising a step of transmitting one or more feedback signals to the processing unit of the one or more haptic devices based on said modified features, whereby said feedback signals are actuated by inflation and/or deflation of one or more of the plurality of the air chambers by one or more of the nano-compressors.

In a preferred embodiment, the associated control signals are adapted to replicate expected input signals for the host system.

In a preferred embodiment, the step of processing the provided motion output signals in the processing unit on the one or more haptic devices, comprises applying a Kalman filtering algorithm on the motion output signals, preferably a linear Kalman filtering algorithm. However, other, more general, types of filters than Kalman filtering can also be used.

By applying a filter, it is possible to reduce the level of noise and guarantee better, more reliable results. The Kalman algorithm is composed by two typical phases: the first one is a prediction of the system state, while the second step consists in updating the prediction made according to the last measurement received. The algorithm runs recursively in real time keeping track only of the previous state and the last measurement. There are several versions of the Kalman filter, each one of them can yield better result according to its specific utilization, where the most common ones are:

Linear Kalman: Normalized sensor data and reference vectors are fed into the Kalman filter, which uses statistical techniques to optimally combine the data into a final orientation reading. Provides the highest-accuracy orientation at the lowest performance;

Alternating Kalman Filter: Uses the same Kalman filter as before, but skips every other update step. Slightly less accurate than the Kalman filter, but faster.

Complementary Filter: Fuses low-pass filtered accelerometer/compass data with high-pass filtered gyroscope data to provide an orientation estimate. Less accurate than any Kalman filtering techniques, but provides significantly higher performance.

Quaternion Gradient Descent Filter: Utilizes gradient descent techniques to avoid the high computational overhead of Kalman-based filters. Provides high performance and high accuracy.

Preferably, the linear Kalman filter is chosen, and applied directly on the processing unit of the haptic device (as well as if a different filtering algorithm would be used). Said filtering algorithm then computes the pitch, roll and yaw angle of the haptic device (and thus typically of the user's hand). In order to perform this computation, it obtains the raw data from a number of sensors, typically these sensors comprise at least one or more of the following: accelerometer, gyroscope, magnetometer, barometer, which can be embedded on the processing unit. Upon receipt, a calibration or normalization is usually performed. Preferably, all four of the aforementioned sensors (accelerometer, gyroscope, magnetometer, barometer) are used for this step. The following step consists in the normalization and conversion of the raw data. They are converted in the desired measurement unit from the rough data given by the sensors, moreover some adjustments are performed due to hardware characteristics. Once the preprocessing phase has been made, the processing unit continues computing the filtered data through the application of the Kalman filter. As said, in order to compute the pitch and roll estimation the algorithm takes advantage of the gyroscope's data and the accelerometer's ones, while, for the yaw angle, the Kalman uses the gyroscope's measurements and the magnetometer ones.

Typically, part of the method of the invention is being run on two programs or levels, a first, called the Core Process, and a second, called the Suite Process. The Core Process is the lowest level of the software layer. It is the core of the integration between the haptic device and the existing host system. Traditional systems, in fact, are not designed to work with sensors, activation thresholds or other features of the haptic device. It is therefore necessary to have a new component that can map the signals it receives from the haptic device into instructions that are understandable to the host system. Having every system its own peculiarities, it must be adapted to the specific host system on which the method and haptic device must operate. This means that once the Core Process has been created for a specific platform, every application running on that platform or system can take advantage and utilize the provided technology.

The Core Process therefore, interacts with the host system. In order to do that, it must emulate the controller devices natively supported, such can be a mouse or a keyboard. Hence, if the user chooses, through the Suite Process, to assign to some movement the same function of the left click of the mouse, or a stroke on the keyboard, the Core Process will send a left click of the mouse or that particular stroke of the keyboard to the host system. As for the mouse or the keyboard, the preprocessing method can be designed to emulate all the common controllers on different kinds of host systems. New systems, however, can be designed to support the haptic device natively without requiring emulation.

As it has been said, the Core Process is system dependent. This means that, according to what kind of technological device the user wants to control and what kind of system is running on it, a specific implementation must be adopted. Possible devices are PCs, Smartphones, PlayStations, Xbox, or newer ones such as Drones or Apple TV. The general principle the proposed method takes advantage of, is that these devices already "react" to some inputs for which they have been designed; inputs such as mouse movements, keyboard strokes, radio signals and many more. The method of preprocessing doesn't substitute these inputs but rather replicates them when needed. To this purpose, the Core Process must be able to listen on a specified interface to which the controller sends its inputs. The interfaces adopted for the method are Serial in case of a wired solution or Bluetooth otherwise, but others can be adopted for specific usages. The Suite Process sets the values of several variables in the code that determines how the Core Process executes its tasks. The commands that Core Process executes are generally system commands furnished by some native APIs. In the case of a Windows system for example, the method can use C #functions to send a keyboard stroke or a mouse event to the running application.

The proposed method and underlying technology offers a wide range of customizations that the user can set through an interactive procedure. The Suite Process will let the user specify his preferences using a graphical interface and gives the user the opportunity to test them clicking on a Test button. The first step of the guided procedure is to load a haptic device which the Suite Process will interact with. To do that the user scans for available devices and chooses how it should be loaded. Possible options are to load a controller as left/right hand or arm. One or more controllers can be used at the same time. After having loaded a device the user has to choose the settings he wants to apply to it. The method offers some predefined configurations profiles for different applications that might be used "as is" or modified to better fit one's own needs. Also, new profiles can be created from scratch and saved for later usage. All the saved profiles are shown in a box where they can be selected with a simple click or a touch. Using a saved profiles becomes particularly useful with the invention because of its high number of parameters combinations. The invention has in fact, a high level of granularity that can fit the needs of even the most demanding experience. Every application, moreover, can have its specific settings and the user can decide to have a different profile for any particular usage. For instance, in the videogames field, when emulating a helicopter piloting, the user will hold the cloche in a different way than he would handle a golf club when playing golf. This means, as described later, that the fingers at rest, or the range of their movements, will vary according to the context. A further key aspect is that different applications may use different input controllers, such as a mouse or a joystick. The method and system can emulate these traditional controllers and lets the user choose which one has to be emulated.

In a third aspect, the invention provides an electronic system for running, managing and interacting with a type of application, preferably a type of application capable of producing a virtual reality (VR) and/or augmented reality (AR), comprising:
  a. An electronic host system for running the application, and for modifying the application (environment) according to received control signals; preferably however, it specifically comprises an electronic host system configured for producing the VR and/or AR, said host system being suitable for running a type of VR and/or AR application, and for modifying the produced VR and/or AR according to received control signals;
  b. at least one at least partly flexible haptic devices suitable to be worn on a user's hand, comprising:
    a. a plurality of sensors configured for detecting hand manipulations of the user's hand and transmitting associated motion output signals, at least comprising: bending of one or more fingers and pressure being exerted by one or more surface on a surface;
    b. a processing unit electronically connected to the plurality of sensors, said processing unit being adapted for receiving the associated motion output signals from one or more of the plurality of sensors, configured for processing the associated motion output signals, and adapted for transmitting the processed motion output signals to the host system via a wireless communication standard, preferably via Bluetooth;
whereby said host system is provided with program instructions to execute the electronic system-implemented method as described in this document.

In a further aspect, the invention provides an electronic system for interacting with an electronic host system running a type of application, and for modifying the application (environment) according to received control signals. Preferably it provides an electronic system for interacting with a virtual reality (VR) and/or augmented reality (AR) produced by an electronic host system, said host system being suitable for running a type of VR and/or AR application, and for modifying the produced VR and/or AR according to received control signals.

Said electronic system for interacting comprises at least one at least partly flexible haptic devices suitable to be worn on a user's hand, comprising:
  i. a plurality of sensors configured for detecting hand manipulations of the user's hand and transmitting associated motion output signals, at least comprising: bending of one or more fingers and pressure being exerted by one or more surface on a surface;
  ii. a processing unit electronically connected to the plurality of sensors, said processing unit being adapted for receiving the associated motion output signals from one or more of the plurality of sensors, configured for processing the associated motion output signals, said processing unit being configured to recognize the type of host system, and adapted for transmitting the processed motion output signals to the host system via a wireless communication standard, preferably via Bluetooth;
whereby said processing unit is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, home video game console, smartphone, dedicated VR and/or AR hardware, robots, drones, smart tvs, smart glasses and similar.

Said system conversion library is typically stored in a memory element of the processing unit, or on the haptic device and accessible by said processing unit.

Furthermore it is to be noted that the electronic device is preferably adapted in order to accommodate the method of the invention for agnostic interaction with an application (environment), preferably a virtual reality (VR) or augmented reality (AR). For one, preferably, the haptic device is configured to recognize or determine the type of the host system, thereby allowing the correct selection of a proper system translation profile for further communication with the host system by the haptic device. Again, preferably the haptic device is furthermore provided with an application conversion library comprising a plurality of application translation profiles for converting motion output signals into control signals acceptable by the host system. Preferably, the system and application conversion libraries are combined into a single conversion library, comprising a plurality of system and application translation profiles. In addition, new system translation profiles for the system conversion library can be created, for instance when faced with an 'unknown' host system. The same applies for new application translation profiles (as these are often customized by users).

Alternatively, the invention provides an electronic system for running, managing and interacting with a type of application (environment), preferably running, managing and interacting with a virtual reality (VR) and/or augmented reality (AR), comprising:
  a. an electronic host system for running the application, and for modifying the application (environment) according to received control signals; preferably this is an electronic host system configured for producing the VR and/or AR, said host system being suitable for running a type of VR and/or AR application, and for modifying the produced VR and/or AR according to received control signals;
  b. at least one at least partly flexible haptic devices suitable to be worn on a user's hand, comprising;
    a. a plurality of sensors configured for detecting hand manipulations of the user's hand and transmitting associated motion output signals, at least comprising: bending of one or more fingers and pressure being exerted by one or more surface on a surface;
    b. a processing unit electronically connected to the plurality of sensors, said processing unit being adapted for receiving the associated motion output signals from one or more of the plurality of sensors, configured for processing the associated motion output signals, and adapted for transmitting the processed motion output signals to the host system via a wireless communication standard, preferably via Bluetooth;
whereby said host system is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, preferably whereby said system conversion library comprises system translation profiles distinctive to at least two or more of the following types of host system: personal computer, home video game console, smartphone, dedicated VR and/or AR hardware, robots, drones, smart tvs, smart glasses and similar. Preferably, said system conversion library is provided to the host system as a downloadable executable. Note that the necessary executable or program can furthermore be provided via a wireless connection from the haptic device to the host system when the haptic device is 'loaded' onto the host system.

Furthermore it is to be noted that the electronic device is preferably adapted in order to accommodate the method for agnostic interaction with a virtual reality (VR) or augmented reality (AR) of the invention. Preferably the host system is furthermore provided with an application conversion library comprising a plurality of application translation profiles for converting motion output signals into control signals acceptable by the host system. Preferably, the system and application conversion libraries are combined into a single conversion library, comprising a plurality of system and application translation profiles. In addition, new system translation profiles for the system conversion library can be created, for instance when faced with an 'unknown' host system. The same applies for new application translation profiles (as these are often customized by users).

Note that in both of the aforementioned embodiments (the further aspect and the alternative thereto), the preferred sensors and their preferred positioning have been discussed already in this document, to which is referred, along with advantages. Preferably, the haptic device comprises a plurality of reversibly inflatable air chambers on the haptic device for exerting pressure and/or force on a body part of the user, and a plurality of nano-compressors for inflating and deflating said air chambers, said method comprising a step of transmitting one or more feedback signals to the processing unit of the one or more haptic devices based on said modified features, whereby said feedback signals are actuated by inflation and/or deflation of one or more of the plurality of the air chambers by one or more of the nano-compressors.

The invention is further described by the following non-limiting examples which further illustrate the invention, and are not intended to, nor should they be interpreted to, limit the scope of the invention.

The present invention will be now described in more details, referring to examples that are not limitative.

EXAMPLES

Example 1: Profile Configuration
(System/Application Conversion Library)

In order to configure a device that has been loaded, the user can take it through a guided procedure that will let him specify all the "zeros". The user can specify what will be his starting position, how he will keep his hand or fingers when at rest and what the maximum span of his movements is. This phase allows the method to calibrate the values of the sensors and interpret them in a proper manner.

The method can for instance allow to set up 'mouse settings'. This allows the user to adopt one of two possible positioning option. He can choose between relative and absolute positioning, and set the sensitivity of her movements through an adjustable bar on the screen. It also allows to specify how the mouse cursor must move when moving the user's hand on a specific axis. Similarly, the user can specify his preferences for the joystick emulation. Also in this case, he can choose the commands to execute upon his hand's movements.

With the proposed haptic device and method, it is possible to configure all the sensors on the device's appendages (the glove's finger), for instance via a menu option "Finger settings". A window will appear where the user can select his options for the bending and pushing sensors. The first type of sensors can be set to act in bending mode or stretching mode. In bending mode, the user normally keeps his finger stretched and the corresponding sensor is activated when the finger is bent. On the contrary, in stretching mode, the user's finger is normally closed and its sensor is activated when the user opens it. Different kinds of commands can be triggered when these actions are performed. For instance, the user can decide to strike the 'w' character or to apply the left-click of the mouse when he bends his index finger. Moreover, it is also possible to set a command's specific activation threshold and assign, at the same sensor, two commands triggered at different thresholds.

Similarly, it is possible to configure the pushing sensors in two modes: pushing and release mode. As in the precedent case, every sensor is activated when the designated threshold is hit and the corresponding action can be executed either when the sensor is pushed (push mode) or as soon as it is released (release mode). In pushing mode, it is possible to configure two commands on the same sensor, according to the intensity which the sensor has been pushed with.

A further feature "Input Axis Settings" can let the user assign commands when moving one's own hand along some axis. It is possible, in fact, to assign a combination of key or mouse clicks to the user's hand motion.

Further options are "Acceleration Settings" and "Barometer settings". The first allows to define what actions must be taken when the user moves his hand either upwards/downwards or leftwards/rightwards with a certain acceleration. Also in this case there is an adjustable bar thanks to which the threshold needed to trigger the command can be set.

"Barometer Settings" can be used to set a series of commands to be triggered at various heights of the user's hand. If the user is simulating a gun fight, for instance, he might want to activate the "sniper" function, when he keeps her hand at eye level, and use a simple gun otherwise. Thanks to the barometer, the method can perceive the height of the user's hand and act accordingly.

Example 2: Haptic Glove

In a possible embodiment, the haptic device comprises a haptic glove (although two gloves may as well be possible) with a supporting base structure (4) of a flexible, wearable glove, which is adapted to contact the palm and back of the hand, and a number of peripheral portions (5) adapted to contact the fingers of the hand. Said haptic glove comprises a number of sensors. Specifically, bending sensors (9) are provided to extend along the fingers, preferably on the backside of the finger (same side as the back of the hand as depicted in FIG. 1), and are configured and positioned to detect the bending of the peripheral portions (as a consequence of the fingers or other body parts bending). The bending sensors (9) can extend somewhat across the metacarpal region of the hand in order to detect a more general bending of the fingers with respect to the hand. Furthermore, a number of pressure sensors (7) are provided at a number of positions. In this case, said pressure sensors (7) are at least provided on the ends of the peripheral portions, this time on the front side (palm side) of the hand. Note that further pressure sensors may be provided at other points of the fingers of the gloves, and/or also on the palm of the hand. Additionally (or alternatively), a number of motion sensors (6) or haptic sensors, may be provided on the haptic glove as well. Typically these are at least provided on the ends of the fingers or peripheral portions again, although they can furthermore be present on the hand portion of the glove as well.

These motion sensors (6) can be supplemented by a platform for one or more sensors, for instance comprising a gyroscope (11) which is in this case present at the base structure (4). Said gyroscope can (furthermore) comprise an AHRS, and/or a height sensor to detect the height of the haptic device with respect to the ground. Furthermore, said platform may comprise a temperature sensor and/or other mentioned sensors.

A processing unit (14) is provided on the haptic device (glove), preferably on the base structure (4), and is provided with a battery (15). Said battery can be rechargeable (mini-USB for instance) and/or replaceable. The processing unit (14) is connected to, or at least able to connect to, the sensors on the haptic device in order to obtain the detected signals (8, 10, 12), generally called motion output signals (8, 10, 12). Preferably this connection is through electric wiring, although wireless connection may also be possible, or a mix of both, for instance in case of several haptic devices (gloves, etc.) and only a single processing unit for all of these.

Said processing unit (14) is configured to communicate with the host system (100), preferably via a wireless communication standard (16).

Example 3: Smartphone Handling

In a possible embodiment, the haptic device, for instance in the form of a haptic glove, can be used in combination with a smartphone. Once the connection is established, the user can provide commands to the smartphone via manipulations of the haptic device (as mentioned before, spatial—relative and/or absolute—movements such as translation, rotation, or via pushing, pulling, pressure, etc.). A system translation profile for the smartphone can be already provided or can be created (or just adapted) to allow the user to control the smartphone without necessarily touching the smartphone. This could potentially allow a user to send a text message, making calls, changing settings, sending e-mails, performing an online search, playing a video, playing music, etc. without handling the smartphone, and in fact without necessarily even seeing it. As an example, the user can via a first gesture generate a motion output signal which is translated by the system translation profile for the smartphone into a control signal for the smartphone that constitutes that the user wishes to send a text message. The user can then, via a second gesture, communicate that he wishes to create virtual keyboard upon which he can then type the message and/or the addressee. A third gesture could then send the text message.

Another example could allow the user to answer an incoming call at an inconvenient time with a known gesture that is translated by the system translation profile as a standardized message to the caller ("Not available now, will call back later", "At work", etc.).

The aforementioned specific use with a smartphone can easily be expanded to smart tvs, smart glasses, etc.

It is supposed that the present invention is not restricted to any form of realization described previously and that some modifications can be added to the presented example of fabrication without reappraisal of the appended claims. For example, the present invention has been described referring to gaming and some other applications, but it is clear that the invention can be applied to more specific applications such as defense or reconnaissance, surgery, modelling, architecture, and others.

The invention claimed is:

1. A method for agnostic interaction with a host system running a type of application, comprising the following steps:
   a. detecting one or more hand manipulations of a user via one or more haptic devices, and providing one or more motion output signals, associated to the hand manipulations, to a processing unit on the one or more haptic devices;
   characterized in that the method comprises the following steps:
   b. providing a system conversion library to said host system, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, wherein said system conversion library comprises system translation profiles distinctive to at least two or more of the following types of host system: personal computer, two or more specific home video game consoles, smartphone, smart glasses, smart tvs;
   c. automatically determining the type of the host system by the processing unit, and wherein in case of inability to determine the type of the host system, allowing the user to either manually determine the type of the host system and/or prompting the user to create a new system translation profile for the undetermined host system, wherein said new system translation profile is stored on the processing unit of the haptic device and/or on the host system;
   d. processing the provided motion output signals in the processing unit on the one or more haptic devices;
   e. transmitting the processed motion output signals to the host system, via a wireless communication standard;
   f. translating said motion output signals by the host system into one or more associated control signals according to the system translation profile distinctive to the host system running the application; and
   g. processing said associated control signals in the application and modifying features therein according to at least said control signals, by the host system.

2. A method for agnostic interaction with a host system running a type of application, comprising the following steps:
   a. detecting one or more hand manipulations of a user via one or more haptic devices, and providing one or more motion output signals, associated to the hand manipulations, to a processing unit on the one or more haptic devices;
   characterized in that the method comprises the following steps:
   b. providing a system conversion library to said processing unit, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, wherein said system conversion library comprises system translation profiles distinctive to at least two or more of the following types of host system: personal computer, two or more specific home video game consoles, smartphone, smart tvs, smart glasses;

c. automatically determining the type of the host system by the processing unit, and wherein in case of inability to determine the type of the host system, allowing the user to either manually determine the type of the host system and/or prompting the user to create a new system translation profile for the undetermined host system, wherein said new system translation profile is stored on the processing unit of the haptic device and/or on the host system;

d. processing the provided motion output signals in the processing unit on the one or more haptic devices;

e. translating said motion output signals by the processing unit into one or more associated control signals according to the system translation profile distinctive to the host system running the application;

f. transmitting the one or more associated control signals to the host system, via a wireless communication standard; and g. processing said associated control signals in the application and modifying features therein according to at least said control signals, by the host system.

3. The method according to claim 1, further comprising a step of:

a. providing an application conversion library to said host system, said application conversion library comprising a plurality of application translation profiles, each application translation profile distinctive to a specific type of application, and each application translation profile being adapted for mapping a conversion of received motion output signals from the one or more haptic devices to one or more associated control signals suitable for said specific type of application, wherein said application conversion library comprises application translation profiles distinctive to at least two or more of the following types of application: shooter application, flight simulator application, driving or racing application, remote piloting application, smart device interaction;

wherein the step of translating said motion output signals into one or more associated control signals according to the system translation profile distinctive to the host system running the application, is executed furthermore according to the application translation profile distinctive to the type of the application being run on the host system.

4. The method according to claim 2, further comprising a step of:

a. providing an application conversion library to said processing unit, said application conversion library comprising a plurality of application translation profiles, each application translation profile distinctive to a specific type of application, and each application translation profile being configured for mapping a conversion of received motion output signals from the one or more haptic devices to one or more associated control signals suitable for said specific type of application, wherein said application conversion library comprises application translation profiles distinctive to at least two or more of the following types of application: shooter application, flight simulator application, driving or racing application, remote piloting application, smart device interaction;

wherein the step of translating said motion output signals into one or more associated control signals according to the system translation profile distinctive to the host system running the application, is executed furthermore according to the application translation profile distinctive to the type of the application being run on the host system.

5. The method according to claim 3, comprising a step of the user manually determining the application translation profile, from the application conversion library, to be used for translating the motion output signals, furthermore allowing the user to create a new application translation profile for the type of application running on the host system, wherein said new application translation profile is stored on the processing unit of the haptic device and/or on the host system.

6. The method according to claim 1, wherein the haptic device is a haptic glove suitable for being worn on a hand of the user, comprising sensors at least adapted for detecting the following hand manipulations, and the intensity and/or speed and/or acceleration of said following hand manipulations: bending one or more fingers of the hand, relatively displacing and/or rotating one or more fingers of the hand with respect to one or more other fingers of the hand, pressure being exerted by a portion of one or more fingers on a surface, pressure being exerted by a portion of the hand on a surface, displacement of the hand with respect to the host system, rotation of the hand with respect to the host system; and wherein said following hand manipulations, and said intensity and/or speed, is provided to the processing unit as associated motion output signals.

7. The method according to claim 1, wherein the processing unit is or is comprised in a smartphone or electronic device, suitable for operable insertion in a virtual reality headset, said smartphone or electronic device comprising one or more sensors for determining spatial displacement of the user: gyroscope, dead reckoning sensor, magnetometer and/or accelerometer; said method comprising the steps of: processing displacement signals from said one or more sensors for determining spatial displacement; providing additional and/or alternative signals to the host system based on said displacement signals to the host system; and furthermore modifying features of the application, by modifying a virtual reality or an augmented reality by the host system according to at least additional and/or alternative displacement signals.

8. The method according to claim 6, wherein the haptic glove is adapted for determining the intensity of said following hand manipulations, comprising a step of calibrating at least the motion output signals associated to the intensity of the bending of one or more fingers of the hand and to the intensity of pressure being exerted by a portion of one or more fingers of the hand.

9. The method according to claim 1, wherein said one or more haptic devices comprise a plurality of reversibly inflatable air chambers on the haptic device for exerting pressure and/or force on a body part of the user, and a plurality of nano-compressors for inflating and deflating said air chambers, said method comprising a step of transmitting one or more feedback signals to the processing unit of the one or more haptic devices based on said modified features, wherein said feedback signals are actuated by inflation and/or deflation of one or more of the plurality of the air chambers by one or more of the nano-compressors.

10. The method according to claim 1, wherein the associated control signals are adapted to replicate expected input signals for the host system.

11. The method according to claim 1, wherein the step of processing the provided motion output signals in the processing unit on the one or more haptic devices, comprises applying a Kalman filtering algorithm on the motion output signals.

12. The method according to claim 3, wherein the system conversion library and the application conversion library are combined in a single conversion library, said conversion library comprising a plurality of translation profiles, each translation profile distinctive to a specific type of application and a specific type of host system and each translation profile being adapted for mapping a conversion of received motion output signals from the one or more haptic devices to one or more associated control signals recognizable for the specific type of host system of the translation profile and suitable for the specific type of application of the translation profile;

and wherein the step of translating said motion output signals into one or more associated control signals is executed according to the translation profile distinctive to the type of host system running the application and the type of application being run.

13. An electronic system for interacting with an electronic host system running a type of application, and for modifying the application according to received control signals, said electronic system for interacting comprising:

at least one at least partly flexible haptic devices suitable to be worn on a user's hand, comprising:
  i. a plurality of sensors configured for detecting hand manipulations of the user's hand and transmitting associated motion output signals, at least comprising: bending of one or more fingers and pressure being exerted by one or more surface on a surface;
  ii. a processing unit electronically connected to the plurality of sensors, said processing unit being adapted for receiving the associated motion output signals from one or more of the plurality of sensors, configured for processing the associated motion output signals, said processing unit being configured to recognize the type of host system, and adapted for transmitting the processed motion output signals to the host system via a wireless communication standard, the processing unit configured for automatically determining the type of the host system by the processing unit, and wherein in case of inability to determine the type of the host system, allowing the user to either manually determine the type of the host system and/or prompting the user to create a new system translation profile for the undetermined host system, wherein said new system translation profile is stored on the processing unit of the haptic device and/or on the host system;

wherein said processing unit is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, wherein said system conversion library comprises system translation profiles distinctive to at least two or more of the following types of host system: personal computer, home video game console, smartphone, dedicated VR and/or AR hardware, smart tvs, smart glasses, robots, drones.

14. An electronic system for running, managing and interacting with a type of application, comprising:
  a. an electronic host system running the application, and for modifying the application according to received control signals;
  b. at least one at least partly flexible haptic devices suitable to be worn on a user's hand, comprising:
    i. a plurality of sensors configured for detecting hand manipulations of the user's hand and transmitting associated motion output signals, at least comprising: bending of one or more fingers and pressure being exerted by one or more surface on a surface;
    ii. a processing unit electronically connected to the plurality of sensors, said processing unit being adapted for receiving the associated motion output signals from one or more of the plurality of sensors, configured for processing the associated motion output signals, and adapted for transmitting the processed motion output signals to the host system via a wireless communication standard, the processing unit configured for automatically determining the type of the host system by the processing unit, and wherein in case of inability to determine the type of the host system, allowing the user to either manually determine the type of the host system and/or prompting the user to create a new system translation profile for the undetermined host system, wherein said new system translation profile is stored on the processing unit of the haptic device and/or on the host system;

wherein said host system is provided with a system conversion library, said system conversion library comprising a plurality of system translation profiles, each system translation profile distinctive to a specific type of host system, and each system translation profile suitable for mapping a conversion of motion output signals from the one or more haptic devices to one or more associated control signals recognizable for said specific type of host system, wherein said system conversion library comprises system translation profiles distinctive to at least two or more of the following types of host system: personal computer, home video game console, smartphone, dedicated VR and/or AR hardware, smart tvs, smart glasses, robots, drones.

* * * * *